Aug. 17, 1965 D. HEYER 3,200,941

ARTICLE FEEDING APPARATUS

Original Filed April 3, 1961

INVENTOR.
DON HEYER
BY
Paul A. Weilein
ATTORNEY

United States Patent Office 3,200,941
Patented Aug. 17, 1965

3,200,941
ARTICLE FEEDING APPARATUS
Don Heyer, 1019 N. Raymond Ave., Fullerton, Calif.
Original application Apr. 3, 1961, Ser. No. 100,413, now Patent No. 3,133,670, dated May 19, 1964. Divided and this application Mar. 10, 1964, Ser. No. 350,817
9 Claims. (Cl. 198—220)

This invention relates to apparatus for feeding articles or small parts to apparatus or locations where the articles or parts may be packaged or otherwise treated.

The present application is a division of application Serial No. 100,413, filed Apr. 3, 1961 for a Control System for Article Feeding Apparatus, now Patent No. 3,133,670.

It is an object of the invention to provide novel and highly efficient apparatus of the character described in which a hopper and novel means for supporting and agitating the hopper constitute a compact unit of simple construction operable for effecting a controlled feeding of articles therefrom in a reliable and predetermined manner onto a chute or other means for disposing the articles at a station or in a machine where they may be packaged or otherwise treated.

Another object of this invention is to provide in apparatus of the character described a novel arrangement of an upright hopper having a spiral guide track on which articles are advanced and discharged at the top of the hopper incident to operation of associated means for effecting a particularly novel vibratory action of the hopper to assure the desired feeding of the articles therefrom.

It is a further object hereof to provide in apparatus of the character described hopper vibrating means which includes a novel combination of a hopper supporting elastomer and power operated means for intermittently moving the hopper angularly about its axis an extent limited by the elastic resistance of the elastomer, which latter will be intermittently stretched and deformed and retracted elastically so as to impart to the hopper an up and down motion that with the angular movement results in a most effective vibration of the hopper for discharging the articles therefrom.

Another object is to provide apparatus having the character described wherein the means for imparting angular movement of the hopper about its axis includes electromagnet means arranged to move lever means on a shaft depending from the hopper so that the hopper is moved intermittently in opposite directions an extent as limited by the elastic resistance of the elastomer supporting the hopper.

Additionally, it is an object hereof to provide in apparatus such as next above noted electromagnetic means wherein two electromagnets are arranged to effect angular movement of the hopper about its axis with one magnet operable to exert a more forceful leverage action and movement of the hopper than the other magnet whereby the resilient vibratory action will be more effective to assure a controlled continuous feeding of articles from the hopper in the manner desired.

Other objects and advantages of the invention will be hereinafter described or will become apparent to those skilled in the art, and the novel features of the invention will be defined in the appended claims.

Referring to the drawing.

Figure 3:
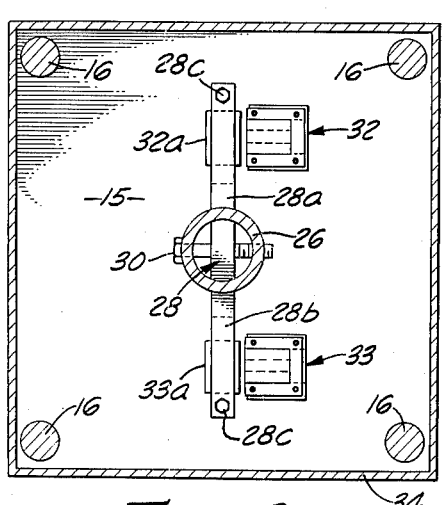
FIG. 3 is a cross sectional view taken on the line 3—3 of FIG. 2.

A preferred embodiment of the present invention includes a hopper 6 supported by actuating means 7 therefor mounted on a suitable support 8. The actuating means 7 is operable to vibrate the hopper in such a manner that the screws S or other loose articles or parts contained therein will be fed therefrom in a reliably controlled manner. The hopper 6 may be in the form of a circular bowl having a bottom wall 9 and a circular side wall 10 on which latter a spiral guide track 11 is provided for feeding the parts or articles through a discharge mouth 12 at the top of the hopper.

Figure 1:
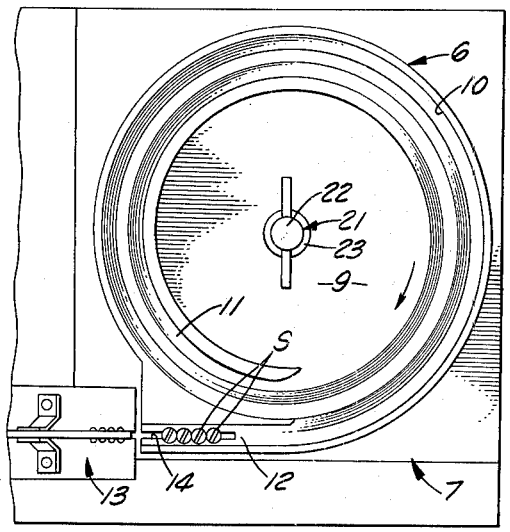
FIG. 1 is a top plan view of article feeding apparatus embodying the present invention.
Figure 2:
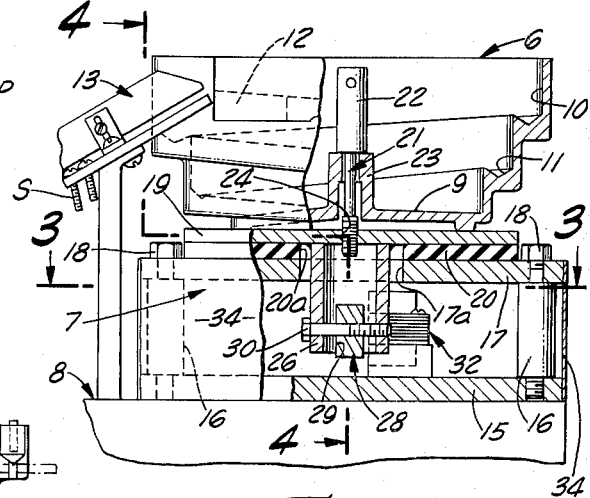
FIG. 2 is a side elevation of the apparatus shown in FIG. 1 with parts broken away and other parts shown in section.
Figure 4:
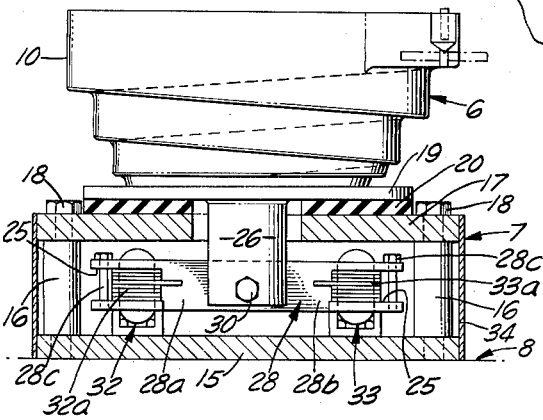
FIG. 4 is a sectional view taken on the line 4—4 of FIG. 2.

Any suitable means may be employed, for example the chute 13 shown in FIGS. 1 and 2, for delivering the articles discharged from the hopper to a station or machine, not shown, where the articles may be packaged or otherwise treated. In this connection it should be noted that the spiral track 11 at the discharge mouth 12 is provided with a slot 14 whereby the articles, if provided with heads as in screws, will enter the slots and pass through the mouth 12 onto the chute 13 which may also be similarly slotted.

The actuating means 7 for supporting and vibrating the hopper 6 includes a base plate 15 suitably rigidly fixed on the support 8 and which rigidly supports thereabove on posts 16 a top plate 17 secured by fastenings 18 to the posts.

A hopper supporting plate 19 is mounted on an elastomer which may be formed as a disk or plate of elastic rubber or synthetic rubber. The upper and lower surfaces of the elastomer 20 are fixed to the surfaces of the hopper supporting plate 19 and the annular top 17 opposed thereto, for example by being vulcanized thereto.

The hopper 6 is detachably secured on the supporting plate 19 with exterior portions of the bottom wall 9 bearing rigidly against this plate. For this purpose a screw threaded member 21 having a head 22 extends through an upright lug 23 at the center of the bottom wall 9 and is screwed into an opening 24 in the plate 19. The head 22 bears against the top of the lug 23 so as to rigidly clamp the hopper in place. This detachable mounting of the hopper makes it possible quickly and easily to replace the hopper with another similar hopper containing articles of a different nature.

The hopper supporting plate 19 is provided centrally thereof with a downwardly extending stub shaft 26 fixed thereto as by welding and which passes freely through openings 20a and 17a in the elastomer 20 and plate 17, respectively.

In accordance with this invention, means are provided for imparting vibratory movements to the hopper 6 through the shaft 26 and the elastomer 20. For this purpose, a lever bar 28 is fixed between its ends to the shaft 26 as by being fitted into a slot 29 in the shaft and fastened thereto by means of a suitable fastening 30. With this arrangement, the bar 28 provides on opposite sides of the shaft 26 lever arms 28a and 28b which when moved will impart a force to the shaft 26 causing it to have limited angular movement about its axis. In this connection, it should be noted that the elastomer 20 is of such thickness and elasticity that it will stretch and deform so as to contract and then return to normal condition under the effects of the forces applied through the lever arms 28a and 28b and the cessation of such forces, respectively. Accordingly, as the lever arms 28a and 28b are intermittently actuated to effect a limited turning movement of the shaft 28 in opposite directions, the hopper will have imparted thereto a vibratory movement which will effect the progressive advance of the articles on the track 11 and outwardly through the discharge mouth 12.

It has been found that the discharging or feeding action of the articles in the hopper becomes more effective if the force applied through one of the two lever arms 28a and 28b to the shaft 26 is greater than the force applied to the other lever arm. Accordingly, means which will be hereinafter described, is provided for effecting this application of differential forces.

As a means for moving the lever arms 28a and 28b, electromagnets 32 and 33 are mounted on the base plate 15 opposite these lever arms. The armatures 32a and 33a for the respective magnets may be mounted in slots 25 in the ends of the lever arms, the armatures being held in place by suitable fastening means 28c. An enclosing member 34 may be employed to form a wall around the plates 15 and 17 to form therewith an enclosure in which the magnets and associated elements are housed.

Figure 5:
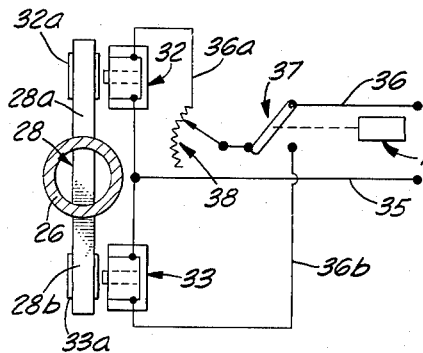
FIG. 5 is a schematic view of an electrically operated means for actuating the feeding apparatus including an electrical circuit therefor.

As shown in FIG. 5, an electrical circuit for the magnets 32 and 33 includes conductors 35 and 36 which may be connected in any suitable manner with a source of electrical energy, not shown. Conductor 35 leads to one side of each of the magnets 32 and 33, whereas conductor 36 is divided by means of a circuit closer 37 so that one lead 36a of this conductor goes to the other side of the magnet 32 while the other lead 36b leads to the other side of magnet 33. The circuit closer 37 is operatively associated with the conductor 36 and the leads 36a and 36b for movement to close the circuit for either of the two magnets. Suitable power operated means generally designated P is employed for moving the circuit closer 37 alternately to energize first one and then the other of the two magnets. This actuating means P may either electrically or mechanically operated provided it is capable of being operated to rapidly and momentarily effect energization of first one magnet and then the other.

In order that the vibratory force may be more effective to feed the articles on the spiral track 11 in the desired manner, means are provided to cause one of the magnets, for example, the magnet 33 to impart a greater turning force to the shaft 26 than is imparted by the other magnet. For this purpose, a potentiometer or similar element 38 is connected in the lead 36a for the magnet 32 so that the electrical energy supplied to the magnet 32 will be reduced according to the adjustment of the potentiometer. This will provide for the transmission of greater electromotive force to the magnet 33 with a consequent quick and more forceful response of this magnet for moving the lever bar 28 and turning shaft 26.

The elastomeric member 20 after having imparted thereto the twisting or torsional force by the magnets 32 and 33 will, upon cessation of the magnet-effected forces, return to normal condition due to the elasticity thereof and this contributes to the desired vibratory movement of the hopper. When twisted and deformed by the action of the magnets, the member 20 is stretched and compressed somewhat with a resulting vertical as well as somewhat spiral movement. This movement also takes place when the elasticity of the member 20 effects return thereof to the original position when either magnet is de-energized. These actions, together with the magnet 33 imparting a greater force than the magnet 32, result in a more effective vibratory movement of the hopper and consequent agitation of the parts therein such that the parts will progressively move upwardly on the spiral track 11 and out through the mouth 12 at the rate and in the reliable manner desired.

With reference to the foregoing description and accompanying drawing, it will be seen that the article feeding means of this invention is particularly simple and compact as to construction and well adapted for being used in connection with machines or apparatus for packaging or otherwise treating the articles discharged from the hopper.

While specific structural details have been shown and described, it should be understood that changes and alterations may be restored to without departing from the spirit of the invention as defined in the appended claims.

I claim:

1. Article feeding apparatus comprising: a hopper for containing a supply of articles; said hopper having a discharge mouth; means in said hopper for advancing said articles so as to discharge through said mouth in response to vibration of said hopper; actuating means operatively connected with the hopper for intermittently effecting movements thereof; a rigid support beneath said hopper; and an elastic disk having opposite surfaces disposed below said hopper and above said support respectively; means fixing one of said surfaces of said disk to said hopper; and means fixing the other of said surfaces to said support so that said disk will be deformed in reponse to said intermittent movements of said hopper to effect said vibration of said hopper.

2. Apparatus as set forth in claim 1 wherein said means fixing said disk to said hopper includes a rigid plate which engages the bottom of the hopper and has one of said surfaces of said disk fixed thereto; and means detachably securing said hopper to said plate.

3. In article feeding apparatus: a hopper for containing a supply of the articles; said hopper having a discharge mouth; means in said hopper operable to advance articles for discharge through said mouth responsive to vibratory movement of said hopper; an elastic disk; a pair of relatively movable rigid plates between which said elastic disk is disposed in fixed relation thereto so as to yield in response to relative movement of said rigid plates; means securing one of said rigid members to said hopper to impart vibratory forces to the hopper in response to said relative movement of said rigid plates; a support on which the other of said rigid plates is mounted; and means for intermittently effecting said relative movement of said rigid plates operable to move said one plate in opposite directions under a greater force in one direction than in the other.

4. In article feeding apparatus: a hopper for containing a supply of the articles; said hopper having a discharge mouth; means in said hopper operable to advance articles for discharge through said mouth responsive to vibratory movement of said hopper; a pair of relatively movable plate members mounted one above the other; an elastic disk disposed between and fixed to said plate members so as to yield in response to relative movement of said plate members; means immovably fixing the lowermost of said plate members; means mounting said hopper in engagement with the uppermost of said plate members for movement therewith; said elastic disk and said lowermost plate member having aligned openings therein; a shaft fixed to said uppermost plate member and extended downwardly through said openings; a lever bar fixed between its ends to said shaft; and actuating means operable at the ends of said lever bar for intermittently moving said lever bar so as to effect angular movement of said shaft about its axis an extent limited by said elastic disk.

5. The apparatus as set forth in claim 4 wherein said actuating means includes means for applying a greater force to one end of said lever bar than to the other end.

6. The apparatus as set forth in claim 4 wherein said actuating means includes electromagnets having their respective armatures disposed at the ends of said lever bar.

7. The apparatus as set forth in claim 4 wherein said actuating means includes electromagnets having their respective armatures disposed at the ends of said lever bar; and means for controlling said electromagnets so that one of said magnets will apply a greater force to one end of said lever bar than is applied at the other end of the lever bar.

8. Article feeding apparatus comprising: a hopper adapted to contain a supply of articles to be fed therefrom; said hopper having a bottom wall; said hopper having a discharge mouth above said bottom wall; means in said hopper operable to advance the articles so as to discharge through said mouth in response to vibration of the hopper; a rigid supporting plate beneath said bottom wall of said hopper; an elastic disk having one side opposed to and fixed to said rigid supporting plate; means connecting the other side of said elastic disk with said bottom wall of said hopper; and actuating means operatively connected with said bottom wall through said connecting means operable for intermittently applying a force to said bottom wall for moving said hopper angularly in opposite directions about the axis of the hopper an extent limited by said resistance of said elastic disk.

9. Article feeding apparatus comprising: a hopper adapted to contain a supply of articles to be fed therefrom; said hopper having a discharge mouth; means inside said hopper providing a track operable to advance the articles so as to discharge through said mouth in response to vibration of the hopper; a rigid supporting member below said hopper; an elastic disk above said rigid supporting member; a hopper supporting member disposed between said disk and the bottom of said hopper; means connecting said hopper supporting member with said hopper; means fixing opposite surfaces of said disk to said supporting members; said disk and said rigid supporting member having openings therein; a shaft extending through said openings and connected to said hopper supporting member; and actuating means connected with and operable to intermittently move said shaft for imparting a vibratory movement to said hopper through said disk and said hopper supporting member.

References Cited by the Examiner
UNITED STATES PATENTS

| | | |
|---|---|---|
| 2,845,168 | 7/58 | Smith et al. |
| 2,875,889 | 3/59 | Sherwen. |
| 2,901,095 | 8/59 | Smith. |
| 2,940,587 | 6/60 | McBean et al. |
| 3,133,627 | 5/64 | Lenders et al. |

SAMUEL F. COLEMAN, *Primary Examiner.*

WILLIAM B. LA BORDE, *Examiner.*